United States Patent [19]

Ricker

[11] Patent Number: 4,989,186

[45] Date of Patent: Jan. 29, 1991

[54] TARGET TRACKING SONAR WITH FALSE TARGET DETECTOR

[75] Inventor: Dennis W. Ricker, Centre Hall, Pa.

[73] Assignee: The United States of America as represented by the Secretary of the Navy, Washington, D.C.

[21] Appl. No.: 414,125

[22] Filed: Aug. 16, 1982

[51] Int. Cl.$^5$ ............................................. G01S 15/00
[52] U.S. Cl. ........................................ 367/97; 367/98
[58] Field of Search ................. 367/1, 87, 89, 90, 97, 367/98, 99, 100

[56] References Cited

U.S. PATENT DOCUMENTS

| | | | |
|---|---|---|---|
| 3,387,256 | 6/1968 | Warner et al. | 367/97 |
| 3,854,115 | 12/1974 | Barthelemy | 367/97 |
| 3,891,960 | 6/1985 | Widener | 367/90 |
| 4,114,153 | 9/1978 | Neidell | 367/90 X |

OTHER PUBLICATIONS

Y. T Chan, A. G. C. Hu, J. B. Plant, A Kalman Filter Based Tracking Scheme with Input Estimation, IEEE Transactions on Aerospace and Electronic Systems, vol. AES-15, No. 2, dtd Mar. 1979, pp. 237-243.

Primary Examiner—Thomas H. Tarcza
Assistant Examiner—Daniel T. Pihulic
Attorney, Agent, or Firm—Sol Sheinbein; John Becker; Harvey David

[57] ABSTRACT

A target tracking sonar system associated with a moving platform incorporates a Kalman filter model and a false target detection capability characterized by comparison of the estimated and actual acceleration to produce an error value which, if greater than a predetermined threshold, namely the product of one half the estimated acceleration and the internal between periodic acceleration updates, generates a signal condition to flag the false target.

6 Claims, 1 Drawing Sheet

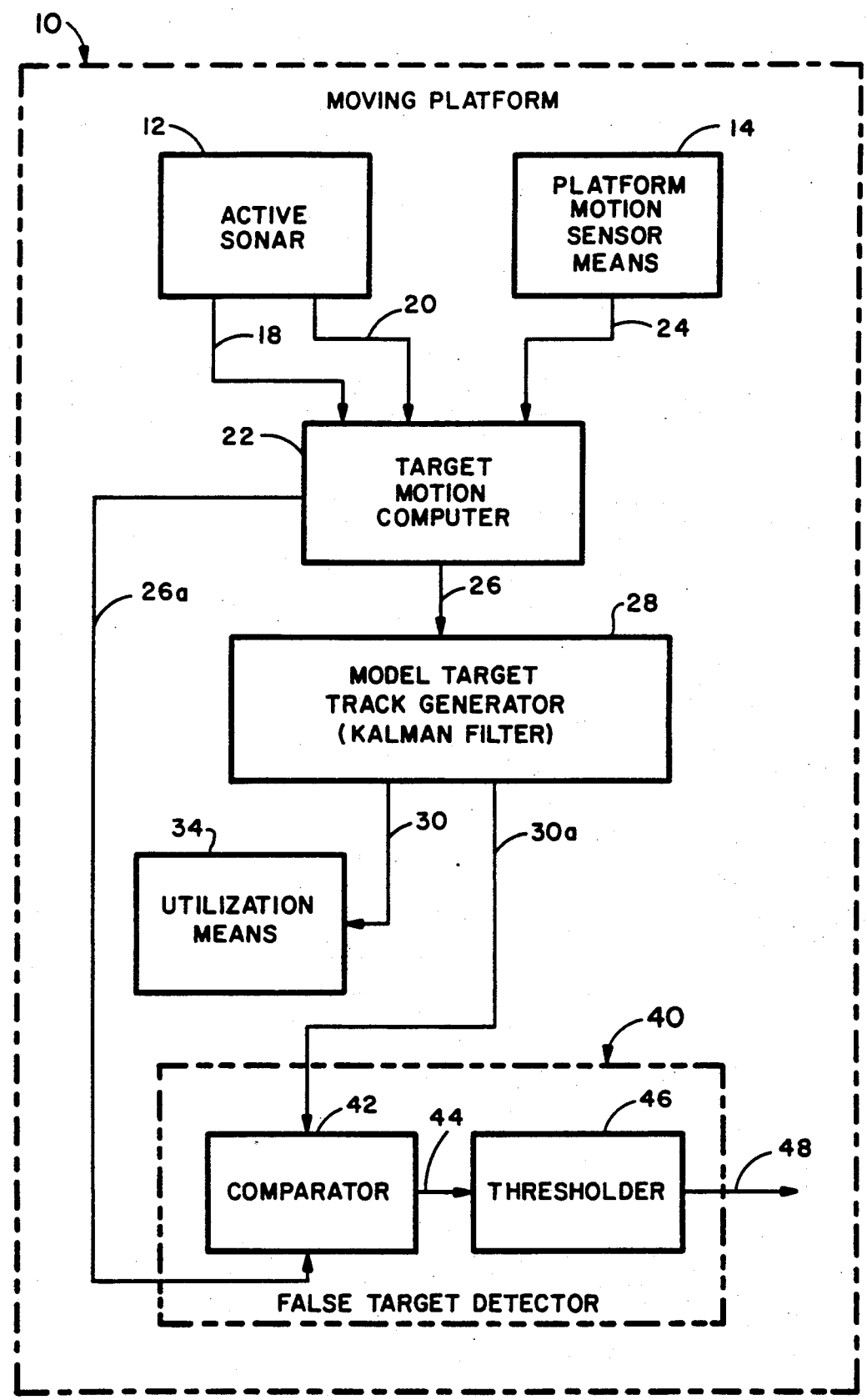

TARGET TRACKING SONAR WITH FALSE TARGET DETECTOR

BACKGROUND OF THE INVENTION

This invention relates generally to the field of sonar, and more particularly to sonar apparatus or systems carried by a moving platform, such as a ship or a weapon, and having the capability of automatically tracking one or more objects or "targets" of interest.

Torpedoes or other weapons have been contemplated as carrying an active sonar that operates to acquire and track a vessel or other target of interest for the purpose of guiding the torpedo autonomously to that target. Sonar is also used in defensive systems carried by vessels likely to become targets of interest to detect the presence of and to track the progress of attacking weapon systems. Either the offensive or the defensive system may transmit a variety of countermeasure signals or deploy decoys which operate either actively or passively in an effort to cause the sonar of the other to lock on or track the decoy rather than the torpedo or the vessel and thereby thwart the offensive or defensive purposes thereof. Accordingly, it is desirable that a target tracking sonar, either as part of an offensive weapon such as a torpedo or as part of a defensive system, have the return signal post-processing, discriminatory editing capability of distinguishing between a real sonar target of interest and other objects, either deployed or natural, such as decoys, schools of fish, whales, or the like, and to rapidly and automatically act on such distinguishing ability to reject targets not of interest. It is well known that at long range, one means of discriminating real targets from counter measures is to look for inconsistancies between measurements of apparent range and range rate when using active sonar to develop track data. Present weapon post-processing editors either do not attempt to discriminate by track data, or do so in a crude manner using raw data and looking merely for consistency of position and Doppler.

Tracking of a moving object using a Kalman filter based approach has been extended from radar to sonar application by developing the combination of an acceleration input vector estimator, a detector for sensing target maneuvers, and a simple Kalman filter updated only when the estimated input vector exceeds or threshold. That development is discussed at length in an article entitled "A Kalman Filter Based Tracking Scheme With Input Estimation" published in IEEE Transactions, Aerospace and Electronic Systems. AEA-15, No. 2, March 1979.

SUMMARY OF THE INVENTION

With the foregoing in mind, it is a principal object of this invention to provide, in combination with a moving platform, a moving target tracking sonar system with return signal post-processing editing capability to distinguish between returns from a real target of interest and returns from a sonar target the track data of which is characterized by relative ranges and range rates indicating target acceleration that is inconsistent with a real target.

Another object of the invention is to provide a more sophisticated and accurate method of target discrimination that utilizes optimal estimation and model reference techniques to perform a measurement of consistency.

Still another object of the invention is to accomplish the foregoing by first performing an optimal estimation of target range and range rate, and secondly, an identification of target acceleration, the components of the identified acceleration vector then being compared to the model estimate and, if they are on the average not equal, generating a flag of the inconsistency indicating a false target.

As yet another object, the invention aims to accomplish the foregoing through the utilization of an adaptive Kalman filter with unique properties of input identification.

Other objects and many of the attendant advantages will be readily appreciated as the subject invention becomes better understood by reference to the following detailed description, when considered in conjunction with the accompanying drawings.

DESCRIPTION OF THE DRAWINGS

The sole FIGURE is a block diagram illustrating a sonar system on a moving platform and embodying a false target detection capability according to the invention.

DESCRIPTION OF THE PREFERRED EMBODIMENT

The invention will be described, by way of example, as being embodied in a sonar system carried on a moving platform which can be a ship, weapon such as a sonar carrying homing torpedo, or the like, and which sonar system is capable of tracking a moving target. Thus, referring to the FIGURE, the dot-dash block 10 represents the moving platform, 12 represents an active sonar, and 14 represents motion sensing means for the moving platform 10. The sonar 12 emits pings at predetermined intervals, receives and interprets echoes in a known manner to provide target range data represented by line 18 and relative bearing data represented by line 20 to a target position computer 22 which also receives platform motion data, represented by line 24, from the motion sensing means 14. The target position computer 22 operates in a known manner to combine the inputs thereto to provide periodic target track updating inputs of, e.g., range, range rate, and acceleration represented collectively by line 26, to a math model target track generator 28 utilizing Kalman filter principles described in the IEEE article mentioned earlier and considered further as this specification proceeds.

The target track generator 28 provides estimated outputs of, e.g., target position coordinates and acceleration, represented collectively by line 30, to utilization means 34 such as a display, or a guidance system, for example in the event the platform 10 comprises a torpedo designed to home on the sonar target, or to condition a weapon that is to be delivered by the platform to intercept the target.

In accordance with this invention, the estimated outputs 30 of the track generator include target acceleration estimates represented by line 30a applied as one input to a false target detector 40 in the form of a comparator 42, coupled as shown via line 44 to a thresholder 46. The other input to the comparator 42 is actual target acceleration data, represented by line 24a and derived from the sonar and motion sensor outputs by the target position computer 22.

Briefly stated, if the actual acceleration of the target as detected by the sonar of the system varies from the Kalman filter estimated acceleration characteristics, for a target of the type considered to be of interest, by amounts which on the average exceed a predetermined threshold value of $\pm T_\mu$ determined in the manner developed herinafter, then the target being tracked is suspect as not being of the type considered to be of interest. In such situation, the thresholder output 48 goes to a condition that serves as a signal to flag the inconsistency. Such an output can, of course, be used to shift sonar tracking emphasis to a different target, institute search for a new target, or other measures appropriate to the situation.

Turning now to the theoretical development of the use of a thresholding value of estimated acceleration as a discriminator between real and false targets, in the earlier mentioned IEEE article it was shown that target range and range rate may be modeled by the state equation $$X_{i+1} = \Phi_i X_i + B_i U_i + W_i \qquad \text{Eq. 1}$$

where, $X_i$ is the two component state vector of range $r_i$ and range rate $v_i$ $$X_i = \begin{bmatrix} r_i \\ v_i \end{bmatrix}. \qquad \text{Eq. 2}$$

$\Phi_i$ is a 2×2 state transition matrix $$\Phi_i = \begin{bmatrix} 1 & T_i \\ 0 & 1 \end{bmatrix} \qquad \text{Eq. 3}$$

where $T_i$ is the integration time for the i-th ping, and $B_i$ is an input matrix $$B_i = \begin{bmatrix} .5T_i^2 & 0 \\ 0 & T_i \end{bmatrix} \qquad \text{Eq. 4}$$

which relates the acceleration input $U_i$ to the state. The input noise is represented by the vector $W_i$ and the state vector is available via the observation relation.

$$Z_i = CX_i + V_i \qquad \text{Eq. 5}$$

where C is the observation matrix and $V_i$ is a zero mean white measurement noise process. In sonar applications, the assumption is made that the state model is deterministic (W=0) but that $V \neq 0$ due to the effects of self and ambient noise and reverberation.

At each ping, new information supplied by the observations (5), is used to update an estimate of the current state generated by the Kalman filter $$X_{i+1} = \Phi_i X_i + K_i [Z_i - CX_i] + B_i U_{i,j-1} \qquad \text{Eq. 6}$$

Where $K_i$ is the gain and $U_{i,j-1}$ is an estimate of the input which is formed from the known platform acceleration and the estimated target acceleration so that, $$U_{i,j} = u_{pi} + u_j. \qquad \text{Eq. 7}$$

The platform acceleration is supplied by the motion sensing system 14 which updates each ping while the target input is estimated each q pings indicated by the index j. Within an identification interval of q pings, the target input is assumed to be constant and at the end of the interval it is updated by $$u_j = u_{j-1} + \delta u.$$

where $\delta \hat{u}$ is obtained by a least square estimator the form of which is given in the IEEE article. It suffices here to state that $\delta \hat{u}$ is an unbiased minimum variance estimator of the apparent input variation $\delta u^*$. Differentiation shall be made between the true target input denoted by $\delta u$ and the apparent input because a false target return may give rise to an erroneous track estimate driven by the apparent input $\delta u^*$. If the target return is consistent with the model (1-5) then one must assume that the apparent input is the true input. The implications of this will be explored in the following sections.

Model Controllability

The Kalman estimator and the input identification algorithm rely on the assumed motion model (1-4) and the available measurements $Z_i$ to produce estimates of the state and the input. No other information is available to the filter. Thus, erroneous measurements, denoted by $Z_i^*$, whether naturally occurring or, more importantly, contrived by a counter measuring effort, will produce the wrong track estimate and the wrong input identification.

First, there must be established whether a particular observation Z, erroneous or not, is consistent with the model. In other words, starting with some initial state, is there an input U which can "control" the system such that $Z_i$ is produced.

Consider the measurement $Z_{i+l}$ made at some point in an identification interval which started at the i-th ping and will extend q pings to the (i+q)-th ping where $0 \leq l \leq q$. The observation $Z_{i+l}$ is associated with a state $X_{i+l}$ by equation 5. Using the model (1) we can write the state at the (i+l)-th ping as a function of the state at the i-th ping and the input as $$X_{i+l} = \prod_{j=0}^{l-1} \Phi_{i+j} X_i + \left[ \sum_{m=0}^{l-2} \left( \prod_{j=0}^{m} \Phi_{i+l-j-1} \right) B_{i+l-m-2} + B_{i+l-1} \right] U_l, \qquad \text{Eq. 9}$$

where $U_l$ is that input applied on the interval (i,i+l) which generates the state $X_{i+l}$. If the input noise $W_i$ is not assumed to be zero one would have to write (9) using the expectation operator. If (9) is rewritten letting $X_{h(i+l)}$ represent the homogeneous solution and denoting the quantity within the brackets by $A_{i+l}$, then $$(X_{i+l} - X_{h(i+l)}) = A_{i+l} U_l. \qquad \text{Eq. 10}$$

Multiplying both sides by the observation matrix C yields $$(CX_{i+l} - X_{h(i+l)}) = CA_{i+l} U_l \qquad \text{Eq. 11}$$

or $$U_l = (CA_{i+l})^{-1} E\{Z_{i+l} - Z_{h(i+l)}\}. \qquad \text{Eq. 12}$$

An observation $Z_{i+l}$ is therefore consistent with the model if (12) holds which requires that the matrix $(CA_{i+l})$ be non-singular.

Note that for arbitrary $Z_{i+l}$ the input sequence $U_l$ need not be constant. The identification algorithm will however fit the best least square constant estimate of $U_l$ on the interval. The important point is that if $(CA_{i+q})^{-1}$ exists, any state and its corresponding measurement $Z_{i+q}$, erroneous or not, is reachable by some input $\delta u$ on an interval of q pings and that the identification algorithm will generate an unbiased estimate $\delta \hat{u}$ of $\delta u$.

Range and Range Rate Consistency

The model (1-4) is a discrete version of the continuous differential equations governing range, range rate, and acceleration, $$\dot{r} = v, r(0) = r_O \qquad \text{Eq. 13}$$

$$\dot{v} = a, v(0) = v_0 \qquad \text{Eq. 14}$$

and consequently, the acceleration input to the model must be a vector with identical components $$U_{i,j} = \begin{bmatrix} u_{pi} + u_j \\ u_{pi} + u_j \end{bmatrix} \qquad \text{Eq. 15}$$

to be consistent. On the average then, the components of the input estimate $\delta \hat{u}$ must also be identical if the measurements $Z_i$ are consistent with motion generated by (13, 14) or discretely by (1-4).

If however the components $\delta \hat{u}_1$, $\delta \hat{u}_2$ are not equal at least to the accuracy imposed by the measurement noise and the identification algorithm, one is assured that the input observations made during the particular identification interval are not consistent with real target motion and therefore suspect.

The obvious question which arises is: are there any conditions under which erroneous measurements might give rise to identical input components masking a false target indication? This question may be answered by considering relations (9-11) and determining the effect of identical acceleration components upon the state.

The components of equation (9) can be expanded using (3,4) so as to obtain $$\sum_{j=0}^{l-1} \pi \Phi_{i+j} = \begin{bmatrix} 1 & \sum_{j=0}^{l-1} T_{i+j} \\ 0 & 1 \end{bmatrix} \qquad \text{Eq. 16}$$

and $$A_{i+l} = \begin{bmatrix} .5 \sum_{m=-1}^{l-2} T^2_{i+l-m-2} & \sum_{m=0}^{l-2} T_{i+l-m-2} \cdot \sum_{j=0}^{m} T_{i+l-j-1} \\ 0 & \sum_{m=-1}^{l-2} T_{i+l-m-2} \end{bmatrix} \qquad \text{Eq. 17}$$

$$= \begin{bmatrix} a_{11} & a_{12} \\ a_{21} & a_{22} \end{bmatrix}. \qquad \text{Eq. 18}$$

If the components of $U_l$ are identical, that is $$U_l = \begin{bmatrix} u_l \\ u_l \end{bmatrix} \qquad \text{Eq. 19}$$

then equation 10 may be written as $$\begin{bmatrix} \Delta r \\ \Delta v \end{bmatrix} = \begin{bmatrix} r \\ v \end{bmatrix}_{i+l} - \begin{bmatrix} r_h \\ v_h \end{bmatrix}_{i+l} = \begin{bmatrix} a_{11} & a_{12} \\ a_{21} & a_{22} \end{bmatrix} \begin{bmatrix} u_l \\ u_l \end{bmatrix} \qquad \text{Eq. 20}$$

so that $$\Delta r = (a_{11} + a_{12})u_l$$

$$\Delta v = (a_{21} + a_{22})u_l$$

and from (17) at the end of an identification interval, $$\left( \frac{\Delta r}{\Delta v} \right)_{i+q} = \qquad \text{Eq. 21}$$

$$\frac{.5 \sum_{m=-1}^{q-2} T^2_{i+q-m-2} + \sum_{m=0}^{q-2} T_{i+q-m-2} \sum_{j=0}^{m} T_{i+q-j-1}}{\sum_{m=-1}^{q-2} T_{i+q-m-2}}$$

$$= \frac{1}{2} \left( \sum_{m=l_i}^{i+q-1} T_i \right) \qquad \text{Eq. 22}$$

$$= \frac{1}{2} \tau \qquad \text{Eq. 23}$$

where $\tau$ is the total length of the identification interval.

Noting from the differential equations (13, 14) that if acceleration (a) is constant, $$r = \frac{1}{2} a \tau^2 + v_0 \tau + r_o \qquad \text{Eq. 24}$$

and $$v = a \tau + v_0 \qquad \text{Eq. 25}$$

or $$\Delta r = r - v_0\tau - r_o = \frac{1}{2} a \tau^2 \qquad \text{Eq. 26}$$

$$\Delta v = v - v_0 = a\tau \qquad \text{Eq. 27}$$

then $\Delta r$ and $\Delta v$ are related by, $$\frac{\Delta r}{\Delta v} = \frac{\frac{1}{2} a \tau^2}{a \tau} = \frac{1}{2} \tau. \qquad \text{Eq. 28}$$

It is then concluded that in order for the acceleration input estimate to be consistent (having identical components), the ratio of the measured range increase and range rate must be $\frac{1}{2}\tau$ over the duration of an indentification interval.

Discrepancy Detection

There results a powerful tool for the detection of targets which do not possess apparent motion consistent with a moving object. An example might be a repeating counter measure which appears at the same range but has significant doppler shift. As the filter tracks the echo, the comparator 42 forms the difference error $$\xi = (\delta \hat{u}_1 - \delta \hat{u}_2) \qquad \text{Eq. 29}$$

where $\delta \hat{u}_1$ and $\delta \hat{u}_2$ are the components of $\delta \hat{u}$, the estimated input. If $\xi$ exceeds the threshold ($\pm T_u$) the identifier output 48 flags that particular track as suspect and indicative of a counter measuring attempt.

The threshold $T_u$ may be determined adaptively so as to provide a given false indication probability since each input estimate involves the computation of the covariance of the estimate. With a consistent measurement sequence, $\xi$ is an unbiased random process with variance $$\sigma_\xi^2 = \sigma_1^2 + \sigma_2^2 - 2\rho_{12} \qquad \text{Eq. 30}$$

where $$\sigma_1^2, \sigma_1^2 \text{ and } \rho_{12}$$

are components of the estimate covariance matrix $$L = \begin{bmatrix} \sigma_1^2 & \rho_{12} \\ \rho_{12} & \sigma_2^2 \end{bmatrix} \qquad \text{Eq. 31}$$

$$= (\psi'\Omega^{-1}\psi)^{-1}$$

computed during each identification interval.

The utilization of an adaptive Kalman filter and discrepancy detection as described herein provides the sonar, whether it be weapon or shipboard, with a powerful tool for the automatic tracking and identification of targets. In operation, each potential target would be tracked by a separate filter and its motion compared with the known properties of targets such as speed, acceleration, and motion consistency. Those echos which are flagged as false targets may then be dropped so that the attack (or defense) can continue against those having the greatest likelihood of being real targets.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A sonar system carried by a moving platform, and operative to track a sonar target, said system comprising:
    active sonar means for obtaining target relative position data;
    means for providing platform motion data;
    means responsive to said relative position data and said platform motion data to provide target actual acceleration data;
    Kalman filter means for generating a math model target track characterized by estimated acceleration data; and
    false target detection means for generating a predetermined output condition whenever said actual acceleration data differs from said estimated acceleration data by acceleration error that is more than a predetermined threshold error value.

2. A sonar system as defined in claim 1, and wherein:
    said sonar means operates to obtain said target data at intervals for periodic updating of said Kalman filter means.

3. A sonar system as defined in claim 2, and wherein:
    said false target detection means comprises means for producing an output representative of said acceleration error as the difference between said actual acceleration data and said estimated acceleration data.

4. A sonar system as defined in claim 3, and wherein:
    said false target detection means comprises thresholder means for producing said predetermined output condition.

5. A sonar system as defined in claim 4, and wherein:
    said predetermined threshold error value is proportional to one half the estimated acceleration times said updating interval.

6. A sonar system as defined in claim 5, and wherein:
    said estimated acceleration data is characterized by equal vector components.

* * * * *